United States Patent [19]
Akira et al.

[11] Patent Number: 5,715,036
[45] Date of Patent: Feb. 3, 1998

[54] PHOTOGRAPHIC PRINTING METHOD AND APPARATUS

[75] Inventors: Toshiro Akira; Muneki Yokoyama; Kazushige Iso; Takeshi Masuda, all of Wakayama, Japan

[73] Assignee: Noritsu Koki Co., Ltd., Wakayama, Japan

[21] Appl. No.: 718,720

[22] Filed: Sep. 24, 1996

[30] Foreign Application Priority Data

Sep. 27, 1995 [JP] Japan .................................. 7-248985

[51] Int. Cl.⁶ .................................................. G03B 27/72
[52] U.S. Cl. .................................................. 355/40
[58] Field of Search .......................... 355/18, 35, 39, 355/40, 41

[56] References Cited

U.S. PATENT DOCUMENTS 5,157,437 10/1992 Takenaka .................................. 355/41
5,438,389 8/1995 Kito et al. .................................. 355/41
5,481,330 1/1996 Yamasaki .................................. 355/41

Primary Examiner—Joan H. Pendegrass
Attorney, Agent, or Firm—Wenderoth, Lind & Ponack

[57] ABSTRACT

A photographic printing method and apparatus for producing photo prints from a plurality of separated negative film pieces of a negative film. The present invention enables efficient printing operation by allowing an operator of the photographic printing apparatus to subject all of the negative film pieces of the negative film, as a whole, to a data reading operation, a print determining operation, and a printing operation. Thus, the present invention eliminates delay times that exist when negative film pieces are individually subjected to the data reading, print condition determining, and printing operations.

4 Claims, 3 Drawing Sheets

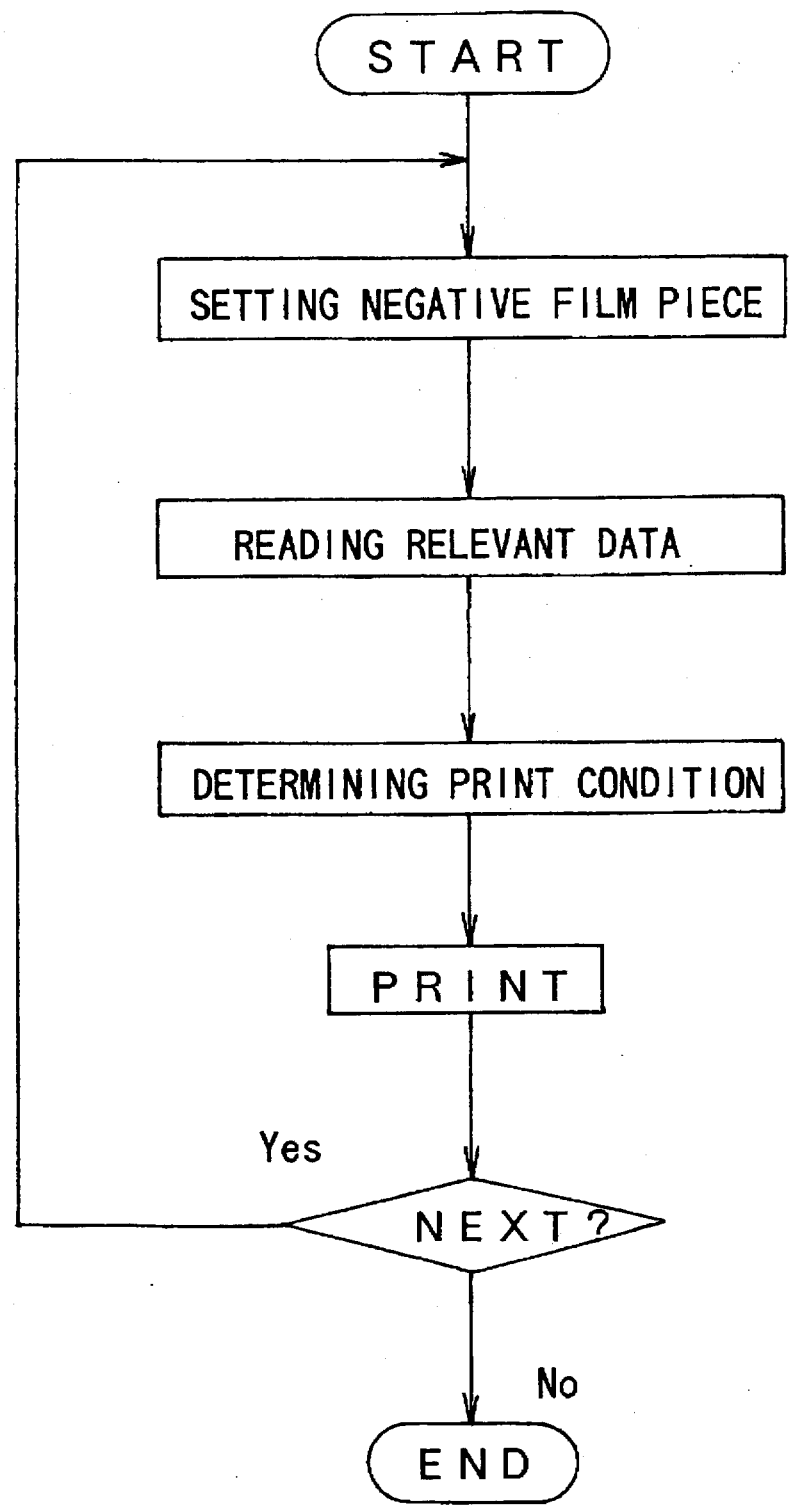

PHOTOGRAPHIC PRINTING METHOD AND APPARATUS

BACKGROUND OF THE INVENTION

The present invention relates to a method and apparatus for producing photographic prints from a plurality of separate negative film pieces which each contain a given number of frames.

Most negative films which contain pictures are commonly requested for a combination of development and printing. Specifically, a negative film containing, for example, 36 frames is loaded in its entirety into a photographic printing apparatus where each frame is printed on a sheet of printing paper. After the printing, the full length of the negative film is separated into pieces which each carry a given number (namely six) of frames. The separated pieces of negative film are then stored in a negative film pouch and are returned to customers along with their prints.

After the full length of the negative film has been separated into a number of pieces, the negative film pieces can then be set in the photographic printing apparatus for extra printing or reprints.

A conventional procedure of printing desired frames of the negative film pieces in a photographic printing apparatus will be explained referring to a flowchart of FIG. 3.

The procedure starts with the negative film pieces being taken out from a film pouch. Specifically, a negative film piece containing a target frame which is desired for printing is placed into the photographic printing apparatus.

The negative film piece is fed into the photographic printing apparatus and is scanned so as to read relevant data of each frame. The relevant data includes data such as image density data and balance data between three primary colors in a distribution.

The relevant data is then used for determining the print condition of each target frame to be printed.

The printing of the target frame on a sheet of printing paper is conducted according to the print condition which determines the image density and the distribution balance between the three primary colors.

The negative film piece, after printing, is discharged from the photographic printing apparatus and a succeeding negative film piece carrying another target frame is then loaded into the photographic printing apparatus for repeating the above described procedure.

Thus, in the conventional method, the negative film pieces are subjected one at a time to a series of data reading, print condition determining, and printing operations in the photographic printing apparatus. When each of the negative film pieces contains at least one target frame to be printed, a standby time occurring between any two operations of the photographic printing apparatus is increased, thus the operating efficiency of the photographic printing apparatus declines.

Also, the conventional method requires an operator for handling and subjecting the negative film pieces, one at a time, to the data reading, print condition determining, and printing operations of the photographic printing apparatus. Accordingly, the handling operation introduces the possibility of human errors and may lead to printing errors.

The relevant data scanned for determining the print condition of a frame is derived from, at best, a limited number (for example, six) of frames from each negative film piece and provides less information than that from the frames (36 frames) of the full length of a negative film. As a result, the print condition is not at a maximum or optimum level and the quality of extra prints will not be equal to that of the primary prints.

SUMMARY OF THE INVENTION

It is an object of the present invention, in view of the foregoing problems, to provide a photographic printing method and apparatus in which a plurality of separated negative film pieces of one negative film, which contain target frames to be printed, are handled at a high level of efficiency and without introducing handling error.

It is another object of the present invention to provide a photographic printing method and apparatus capable of determining accurate and improved print condition so that the quality of extra prints or reprints are equal to that of the primary or original prints.

For achievement of the primary object of the present invention, a photographic printing method and apparatus of producing photo prints from a plurality of separate negative film pieces which each contain a given number of frames is provided in a photographic printing apparatus which includes a data reading means for reading relevant data from the negative film, a print condition determining means for determining print conditions from the relevant data read by the data reading means, and a printing means for printing images on a sheet of printing paper according to the print conditions determined by the print condition determining means, comprising: a first stage of reading the relevant data from the plural negative film pieces supplied in sequence to the data reading means; a second stage of determining the print condition of each frame from a combination of each frame data and total data in the relevant data obtained at the first stage; and a third stage of printing target frames of the negative film pieces supplied in sequence to the printing means according to the print conditions determined at the second stage.

The first stage allows all the separated negative film pieces from one single film to be supplied to the data reading means.

BRIEF DESCRIPTION OF THE DRAWINGS

FIG. 3 is a flow chart describing a photographic printing method of the prior art.

DETAILED DESCRIPTION OF THE PREFERRED EMBODIMENT

Figure 2:
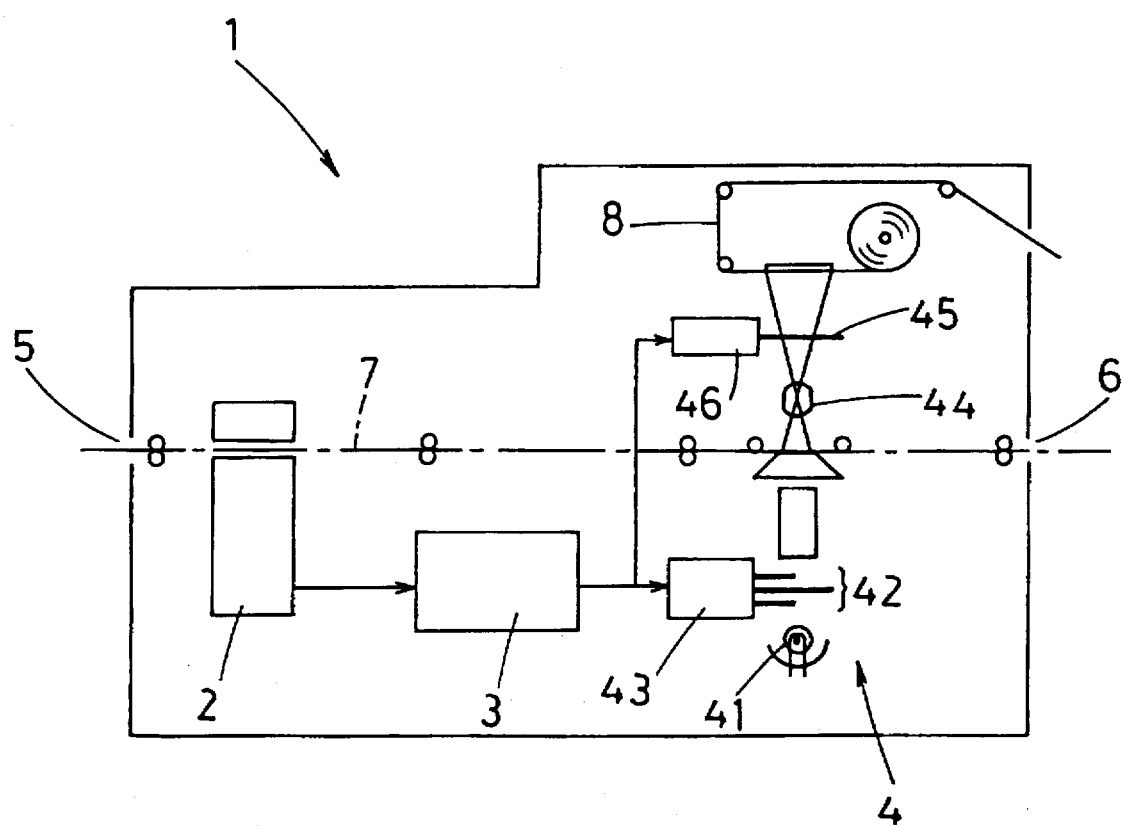
FIG. 2 is a schematic representation of the photographic printing apparatus implementing the photographic printing method of the present invention.

A photographic printing method and apparatus according to the present invention will be described referring to the accompanying drawings. As shown in FIG. 2, a photographic printing apparatus 1 comprises a data reading means 2 for reading and acknowledging data from a negative film, a print condition determining means 3 for determining print conditions in response to the data read by the data reading means 2, and a printing means 4 for printing images on a sheet of printing paper according to the print conditions determined by the print condition determining means 3.

Also shown is a negative film inlet 5, a negative film outlet 6, a negative film transfer passage 7 extending from the inlet 5 to the outlet 6, and a sheet of printing paper 8. The printing means 4 includes a light source 41, a light modulator filter 42 for cyan, magenta and yellow primary colors, a lens unit 44, a shutter 45, and a controller 46 for the shutter 45.

Figure 1:
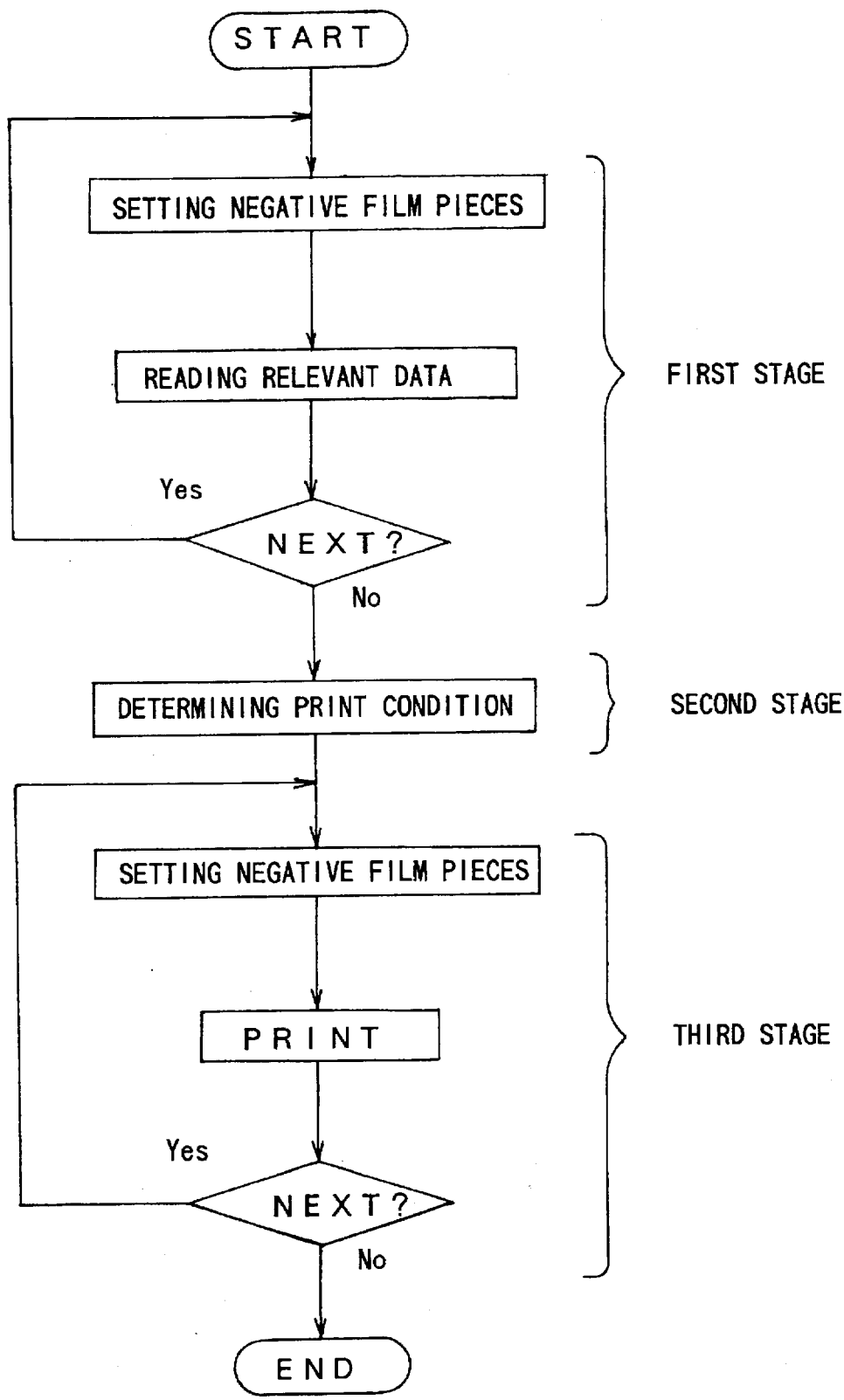
FIG. 1 is a flow chart describing the photographic printing method of the present invention.

A procedure of printing photo prints from negative film pieces located in the photographic printing apparatus 1 will be explained referring to FIG. 1.

The procedure starts with a first stage where a negative film piece, which contains a desired target frame(s) to be printed, is taken out from a negative film pouch and placed at the inlet 5 of the photographic printing apparatus 1.

The negative film piece is then introduced into the photographic printing apparatus 1 and is conveyed to the data reading means 2 where all frames on the negative film piece are scanned so as to read relevant data including image density and balance data between the three primary colors in a distribution.

The negative film piece, after being scanned, is discharged from the outlet 6 of the photographic printing apparatus 1 so as to allow a succeeding negative film piece to be placed at the inlet 5. If the succeeding negative film piece contains another target frame that is desired for printing, it is placed at the inlet 5, conveyed, and scanned. Once all of the negative film pieces of one negative film have been scanned, the procedure shifts to a second stage.

At the second stage, the print conditions are determined at the print condition determining means 3. More particularly, an average is calculated from, for example, data readings of the image density and the balance between the three primary colors in a distribution of all the target frames scanned at the first stage and the average is then compared with the reading of each individual target frame for determining the print condition of each individual target frame.

This is followed by a third stage where the negative film pieces containing the target frames are placed again at the inlet 5 of the photographic printing apparatus 1 in a sequence similar to that of the first stage.

The negative film pieces are then fed and conveyed to the printing means 4 in the photographic printing apparatus 1. The printing means 4 controls the shutter 45 and the light modulator filter 42 according to the printing conditions determined at the second stage 2 so that the image density and distribution balance between the three primary colors are optimized, thereby printing the target frames in sequence on the printing paper sheet 8.

Each of the negative film pieces, after being printed, is discharged from the outlet 6 of the photographic printing apparatus 1 and is returned back to their pouch. Thus, when one negative film piece is discharged, another is placed at the inlet 5 and is fed and subjected to the printing procedure. After the printing of all of the negative film pieces of the entire negative film is completed, the procedure is terminated.

In the photographic printing method of the present invention, the first stage allows the negative film pieces which contain target frames in the entire negative to be scanned for reading their relevant data, the second stage determines the print conditions of the target frames respectively, and the third stage performs printing of all the negative film pieces. Therefore, the method of the present invention will minimize the standby time occurring between any two operations of the photographic printing apparatus and will increase the operating efficiency for one order of negative film containing the negative film pieces, as compared with the conventional method in which the negative film pieces are subjected one at a time to a series of the data reading, print condition determining, and printing operations.

Also, the method of the present invention allows the operator of the photographic printing apparatus to subject all of the negative film pieces of a negative film, as a whole, to the data reading operation of the first stage, the print condition determining operation of the second stage, and the printing operation of the third stage. Hence, handling error will be minimized because the troublesome process of the conventional method, in which the negative film pieces of a negative film are individually subjected to a series of the data reading, print condition determining, and printing operations is eliminated.

Although the first stage of the photographic printing method of the present invention allows a selected number of the negative film pieces containing target frames to be set at the inlet 5 and to be conveyed to the data reading means 2, all the negative film pieces of a negative film, separated from the full length of a film, may be supplied to the data reading means 2 regardless of whether the pieces contain target frames.

If two of the negative film pieces out of the entire negative film contain target frames, the print condition determining operation of the second stage is conducted with data from the total frames (e.g. 12 frames) of the two negative film pieces. This may provide a lower level of a print condition than that would exist is the full frames (e.g. 36 fames) of the negative film were used.

When all the negative film pieces of the negative film are subjected to the data reading operation of the data reading means 2 in the first stage, the print condition determining operation of the second stage is performed with data of the full or 36 frames and, thus, a higher level of a print condition for extra prints or reprints, equivalent to that for the primary or original prints, would be achieved. As the result, the extra prints or reprints would be equal in quality to the primary or original prints.

It is also desirable to provide the present invention with a feature such that, while the third stage of the present method allows the negative film pieces to be set at the inlet 5 of the photographic apparatus 1 in the same order as in the first stage, any setting in a different order is indicated by an error signal produced by the photographic printing apparatus 1 or by a means for automatically assigning the print conditions to respective film pieces set in the different order.

What is claimed is:

1. A photographic printing method of producing photo prints from a plurality of separated negative film pieces of a negative film in a photographic printing apparatus, wherein each of said plurality of separated negative film pieces contains a predetermined number of frames, and wherein at least one of the predetermined number of frames is a target frame, said method comprising:

reading print data from the predetermined number of frames of said plurality of separated negative film pieces sequentially;

determining a print condition for each target frame contained in each of said plurality of separated negative film pieces, wherein the print condition of each target frame is based on a combination of the print data read from the target frame at the reading step and average data of all the print data read from the predetermined number of frames of said plurality of separated negative film pieces at said reading step; and printing the target frames of said plurality of separated negative film pieces of the negative film sequentially according to the print conditions determined for each target frame in said determining step;

wherein said reading, determining, and printing steps are performed in independent stages such that all of said plurality of separated negative film pieces of the negative film are subjected to one stage before moving to the next.

2. A photographic printing method according to claim 1, wherein said plurality of negative film pieces of the negative film comprise all negative film pieces of the negative film.

3. A photographic printing apparatus for producing photo prints from a plurality of separated negative film pieces of a negative film, wherein each of said plurality of separated negative film pieces contains a predetermined number of frames, and wherein at least one of the predetermined number of frames is a target frame, said apparatus comprising:

reading means for reading print data from the predetermined number of frames of said plurality of separated negative film pieces sequentially;

determining means for determining a print condition for each target frame contained in each of said plurality of separated negative film pieces, wherein the print condition of each target frame is based on a combination of the print data read from the target frame by said reading means and average data of all the print data read from the predetermined number of frames of said plurality of separated negative film pieces by said reading means; and printing means for printing the target frames of said plurality of separated negative film pieces of the negative film sequentially according to the print conditions determined for each target frame by said determining means;

wherein all of the plurality of separated negative film pieces of said negative film are subjected to said reading, determining, and printing means in independent stages such that all of said plurality of separated negative film pieces of the negative film are subjected to one stage before moving to the next.

4. A photographic printing apparatus according to claim 3, wherein said plurality of negative film pieces of the negative film comprise all negative film pieces of the negative film.

* * * * *